United States Patent
Hester

(10) Patent No.: US 9,923,757 B1
(45) Date of Patent: Mar. 20, 2018

(54) REDUCING DATA SETS RELATED TO NETWORK SECURITY EVENTS

(71) Applicant: Akamai Technologies, Inc., Cambridge, MA (US)

(72) Inventor: Lance E. Hester, Fort Lauderdale, FL (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 15/723,704

(22) Filed: Oct. 3, 2017

(51) Int. Cl.
  *H04L 29/06* (2006.01)
  *H04L 12/24* (2006.01)
  *G06F 17/30* (2006.01)
  *G06F 21/50* (2013.01)

(52) U.S. Cl.
  CPC .... *H04L 41/0604* (2013.01); *G06F 17/30327* (2013.01); *G06F 17/30598* (2013.01); *G06F 21/50* (2013.01); *H04L 41/0631* (2013.01); *H04L 63/14* (2013.01); *G06F 17/30902* (2013.01); *H04L 63/1408* (2013.01)

(58) Field of Classification Search
  CPC . H04L 63/14; H04L 63/1408; H04L 63/1416; H04L 63/1425; H04L 63/1433; G06F 21/50; G06F 21/55; G06F 21/552; G06F 21/554
  See application file for complete search history.

(56) References Cited

U.S. PATENT DOCUMENTS

| 7,478,429 | B2 | 1/2009 | Lyon et al. |
|---|---|---|---|
| 2008/0284581 | A1 * | 11/2008 | Sheleheda ........... H04L 41/0627 340/506 |
| 2012/0230222 | A1 * | 9/2012 | Shaffer .................. H04L 41/12 370/254 |

OTHER PUBLICATIONS

U.S. Appl. No. 15/608,542, filed May 30, 2017, available in IFW.
Julisch, Mining Alarm Clusters to Improve Alarm Handling Efficiency, 17th Annual Computer Security Applications Conference (ASAC), pp. 12-21, Dec. 2001,10 pages.
Warnars, et al., Easy Understanding of Attribute Oriented Induction (AOI) Characteristic Rule Algorithm, International Journal of Applied Engineering Research ISSN 0973-4562 vol. 11, No. 8 (2016) pp. 5369-5375, Reasearch India Publication. Available at http://www.ripublication.com, 7 pages.
Warnars, Attribute Oriented Induction with simple select SQL statement, 1st International Conference on Computation for Science and Technology (ICCST-I), Chiang Mai, Thailand, Aug. 4-6, 2010, 17 pages. Downloaded Oct. 19, 2017 from https://arxiv.org/abs/1006.1695.

* cited by examiner

*Primary Examiner* — Edward Zee

(57) ABSTRACT

This document describes techniques for reducing a size of data sets related to network security alarms or logs, or other messages. Preferably, the reduction is performed via a clustering and compressing algorithm that, among other things, enables an operator to provide customized control in the form of ordered, per-attribute thresholds, or "stop" points. These thresholds function to preserve important information while still achieving excellent clustering and compression results. In some embodiments, the technique described herein can be used to reliably produce reduced-size data sets composed entirely of unique entries. The unique entries can thus be used as keys into a database, e.g., for storage and later analysis or other purposes.

19 Claims, 12 Drawing Sheets

| Raw Structured Data 4100 | | | | |
|---|---|---|---|---|
| | Attribute 1 | Attribute 2 | Attribute j | ... | Attribute M |
| Entry 1 | Value(1,a1) | Value(1,a2) | Observation(1,aj) Observation(2, aj) | | Value(1,aM) |
| Entry 2 | Value(2,a1) | Value(2,a2) | Value(2,aj) | | Value(2,aM) |
| ... | | | | | |
| Entry z | Value(z,a1) | Value(z,a2) | Value(z,aj) | | Value(z,aM) |

| Modified Structured Data 4500 | | | | |
|---|---|---|---|---|
| | Attribute 1 | Attribute 2 | Attribute j | ... | Attribute M |
| Entry 1a | Value(1,a1) | Value(1,a2) | Observation(1,aj) | | Value(1,aM) |
| Entry 1b | Value(1,a1) | Value(1,a2) | Observation(2,aj) | | Value(1,aM) |
| Entry 2 | Value(2,a1) | Value(2,a2) | Value(2,aj) | | Value(2,aM) |
| ... | | | | | |
| Entry z | Value(z,a1) | Value(z,a2) | Value(z,aj) | | Value(z,aM) |

| Raw Structured Data 4100 | | | | | |
|---|---|---|---|---|---|
|  | Attribute 1 | Attribute 2 | Attribute j | ... | Attribute M |
| Entry 1 | Value(1,a1) | Value(1,a2) | Observation(1,aj)<br>Observation(2, aj) |  | Value(1,aM) |
| Entry 2 | Value(2,a1) | Value(2,a2) | Value(2,aj) |  | Value(2,aM) |
| ... |  |  |  |  |  |
| Entry z | Value(z,a1) | Value(z,a2) | Value(z,aj) |  | Value(z,aM) |

| Modified Structured Data 4500 | | | | | |
|---|---|---|---|---|---|
|  | Attribute 1 | Attribute 2 | Attribute j | ... | Attribute M |
| Entry 1a | Value(1,a1) | Value(1,a2) | Observation(1,aj) |  | Value(1,aM) |
| Entry 1b | Value(1,a1) | Value(1,a2) | Observation(2,aj) |  | Value(1,aM) |
| Entry 2 | Value(2,a1) | Value(2,a2) | Value(2,aj) |  | Value(2,aM) |
| ... |  |  |  |  |  |
| Entry z | Value(z,a1) | Value(z,a2) | Value(z,aj) |  | Value(z,aM) |

Generalized Logical Topologies k-th Attribute
where k ∈ M attributes,
where M = {set of all desired attributes}

Concepts        Depth/Level 1       0

2       1

5       2

Attribute 1 (IP Address): Tree Structure

Attribute 2 (Observations): Tree Structure

REDUCING DATA SETS RELATED TO NETWORK SECURITY EVENTS

BACKGROUND

Technical Field

This application relates generally to the detection, identification, and mitigation of computer network attacks and more specifically to techniques for reducing data sets of event messages in a network monitoring system.

Brief Description of the Related Art

Network security systems like anomaly and intrusion detectors, firewalls, and router log applications can create hundreds to thousands of messages per second when monitoring traffic. The messages might be log lines in a log file, alarm messages, or anomaly observations. Then there are also multi-tenant monitoring and mitigation platforms, such as the one described in U.S. Pat. No. 7,478,429, the teachings of which are hereby incorporated by reference in their entirety. That patent illustrates and describes a data cleaning center 100 with a set of routers (102, 108 in that patent's FIG. 1) and attack mitigation modules (110 in that patent's FIG. 1), each of which may detect and discard attack traffic. Such platforms, with their large number of devices and monitoring traffic directed to many different origin sites, generate an even higher number and variety of messages.

Data sets about network security events can quickly become quite large and complex. Such message onslaughts can deluge human analysts. Massive messaging strains 'eyes on glass' observers like those in Security Operation Centers (SOCs) described in the above patent and otherwise known in the art. On one hand, surplus and repeated observations encapsulated in messages have the benefit of emphasizing the severity of specific events like the constant use of a Distributed Denial of Service (DDoS) attack vector or the root cause of an event in the case of router logs. But, on the other hand, repetitive and monotonous messages have the disadvantage of distracting operators. An operator might miss important key events of interest because the event is obscured by the volume of messages, and thus misidentify or fail to identify a threat.

From a capital and operational cost point of view, too much messaging consumes precious memory (e.g., RAM, static memory) and computational resources like in the case of user interface (UI) visualization processing when excess message contents could be further generalized without loss of relevancy of messages.

What is needed is a method to intelligently reduce the volume of messages without loss of nuance, preferably by clustering messages/observations, grouping them in a meaningful way and to remove redundant messages, so as to avoid missing relevant signals. Moreover, the method has to be able to handle message that are a mix of heterogeneous data types (e.g., numeric, string, categorical, and time).

It is known in the art to use attribute-oriented-induction algorithms to cluster and compress messages and mine data therefrom, as in H. Warnars et al., "Easy Understanding of Attribute Oriented Induction (AOI) Characteristic Rule Algorithm", Int'l Journal of Applied Engineering Research, Research India Publications, ISSN 0973-4562 Volume 11, Number 8 (2016) pp 5369-5375 and K. Julisch, IBM Research, Zurich Research Laboratory, "Mining Alarm Clusters to Improve Alarm Handling Efficiency" in 17th Annual Computer Security Applications Conference (ASAC), pages 12-21, December 2001.)

But, these prior art approaches are inadequate for use in large-scale network security platforms that must analyze multi-tenant traffic in real-time or near-real-time and implement mitigation for observed attacks. Among other things, this is because the approaches are insufficiently flexible and may elide information necessary for attack analysis and mitigation.

The teachings hereof improve on prior approaches to provide a practical, technical solution. The teachings hereof also provide other benefits and improvements which will be described herein or apparent to those skilled in the art from review of this document.

SUMMARY

This document describes methods, systems, and apparatus for processing a set of messages generated by network security devices to reduce volume while retaining information crucial to security analysis. The messages might include alarms, alerts, triggered rules or filters, or other event notifications that were produced when a network security device detected an attack or potential attack on a target system. As mentioned earlier, such event message data sets can become quite large and complex. By intelligently reducing such data sets, the data sets can become more manageable. But, if prior art techniques are used, that reduction process may elide information that security personnel need, not only to identify and understand an attack, but also to effectively mitigate it (e.g., by writing firewall rules or access control lists).

Preferably, a data set of event messages is intelligently reduced via a clustering and compressing algorithm. The algorithm can enable an operator to provide customized control over the process in the form of ordered, per-attribute thresholds, or "stop" points. The thresholds function to preserve important information while still achieving excellent clustering and compression results. In some embodiments, the technique described herein can be used to reliably produce reduced data sets composed of unique messages. The unique messages can then be used as keys into a database, e.g., to link them to information regarding mitigation strategies or rules to apply.

The teachings hereof are particularly, but not exclusively, useful in the context of a multi-tenant data cleaning center that monitors and "scrubs" attacks from network traffic before it reaches a tenant's (customer's) infrastructure.

As those skilled in the art will recognize, the foregoing description merely refers to examples of the invention. There are many variations of the inventive teachings described herein. The claims alone define the scope of the invention for which protection is sought.

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which:

FIG. 4 provides two tables that illustrate raw and modified structured data that is handled by the system;

DETAILED DESCRIPTION

Figure 1:
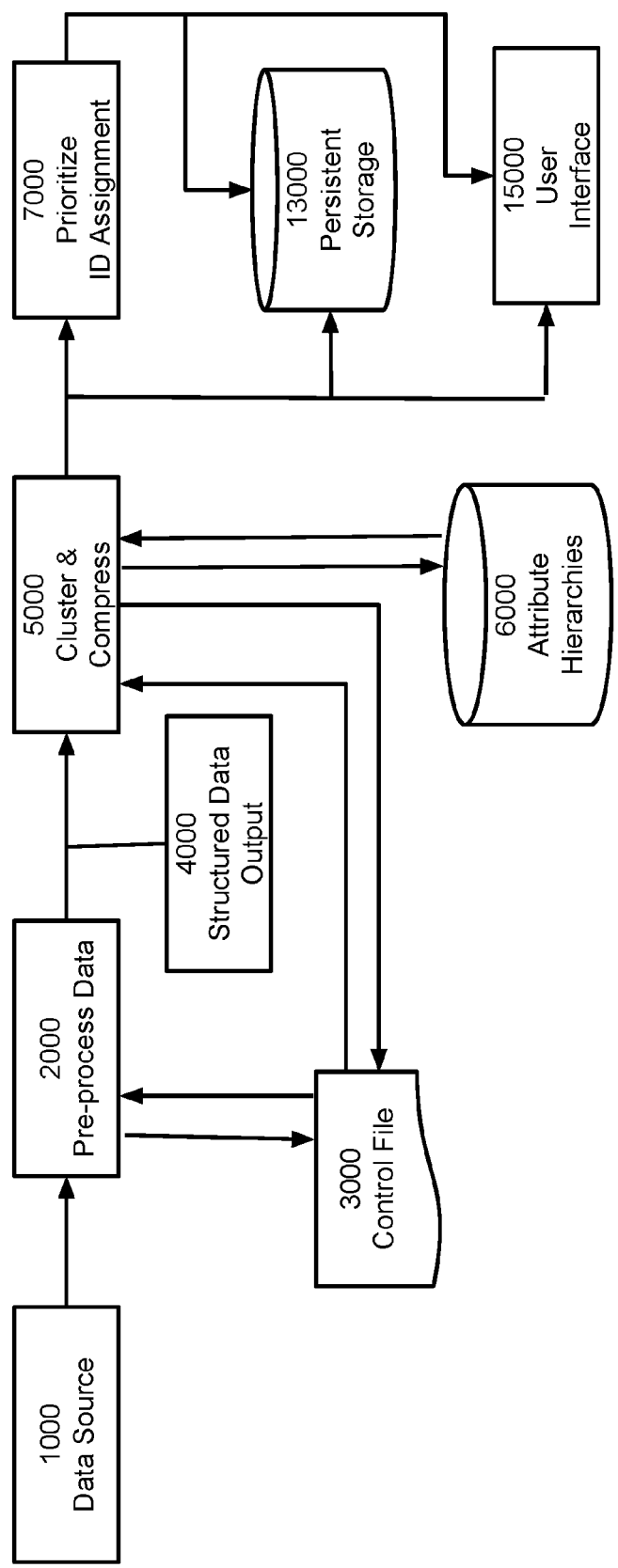
FIG. 1 is a schematic diagram illustrating one embodiment of a system for clustering and compressing a data set of event messages.

The following description sets forth embodiments of the invention to provide an overall understanding of the principles of the structure, function, manufacture, and use of the system, methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g.," used throughout is used as an abbreviation for the non-limiting phrase "for example."

Basic familiarity with well-known web, streaming, and networking technologies and terms, such as HTML, URL, XML, AJAX, CSS, HTTP versions 1.1 and 2, TCP/IP, and UDP, is assumed. The term "server" is used herein to refer to hardware (a computer configured as a server, also referred to as a "server machine") with server software running on such hardware (e.g., a web server). Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

Glossary of Terms

Attribute means an attribute of interest from an event message or other source of data. An attribute typically has a name of the metric or quantity of interest, and a value. An attribute is sometimes referred to in this document as a metric.

Attribute name means the name of the attribute, such as IP address, Observation, Protocol, etc.

Attribute value means the value of a particular attribute, such as the numerical IP address, port number, qualitative value like 'high', 'low', etc.

Categorical attribute means discrete values that can be unordered, for example, IP addresses, port numbers, header flags.

Control file means a file or group of files that contains information informing an application(s) that handles data how to handle that data. A control file can help to initiate variables, processing functions, or specify other files to be transmitted. In the embodiments described in this document, the control file communicates input and output files names (plus associated file directory paths), key variable names of interest, numeric constants, and other associated metadata. However, the teachings hereof can be practiced with control mechanisms other than a control file.

Measure means integer, decimal, or string values of a particular attribute.

Numerical attribute means, in general, items that are counters, e.g., decimal or integers, like the number of packets per second.

String attributes assume arbitrary text values.

Structured data means any data that resides in a fixed field within a record or file. This includes data contained in relational databases and spreadsheets, or comma separated value (csv) formatted files.

Time attribute means involving date and time values (e.g., 2016-11-03).

Tuple means an ordered set of data constituting a record or row entry in a table or data file.

Unstructured data means an unorganized mix of various data objects that are usually collected, identified, categorized, and stored in an organized fashion (i.e., structured) before the data can be searched or provide insights.

Introduction

Preferably, the data processing techniques, described below, are implemented in a computer system that is part of, or adjunct to, a network security device(s) in a data cleaning center. For example, the teachings hereof may be implemented within and for a data cleaning center 100 such as that described in U.S. Pat. No. 7,478,429, mentioned earlier, and again the teachings of which are hereby incorporated by reference in their entirety. That patent illustrates and describes a data cleaning center with a set of routers (102, 108 in that patent's FIG. 1) and attack mitigation modules (110 in that patent's FIG. 1), each of which may detect and discard attack traffic. Clean traffic is then passed to protected resources such as the second computers (labeled as 80a-d in that patent's FIG. 1). It should be understood that the teachings hereof are not limited to a particular architecture for the data cleaning center 100. Indeed, in other embodiments, the data cleaning center 100 and/or components therein may be replaced with a single router, firewall, intrusion protection system, or other device, and yet the teachings hereof still apply. The term network security device is used to refer to any component in such a data cleaning center or such individual device.

There may be multiple data cleaning ("scrubbing") centers with load-balancing and the scale necessary to handle massive Internet traffic destined for a wide range of customer host machines. Preferably, the machines in the scrubbing center act as a proxy for customers, such that the "dirty traffic" flows into the scrubbing center and "clean" data flows out to customer data centers, preferably unbeknownst to the Internet user or malicious actor attempting to reach the customer's Internet site.

In a preferred data cleaning center, ingress routers or switches (sometimes referred to as "border routers") allow interjection of the Internet traffic to the data cleaning center. Signatures, rules, blacklists, thresholds, access control entities and access control lists, deep packet inspection, etc. on the ingress routers or switches function to drop traffic, write log lines, and issue alerts; the algorithms described herein will process these log lines and/or alerts, i.e., using the cluster and compress and other techniques described herein. Mitigation appliances work to clean traffic. Egress routers or switches (sometimes referred to as "access routers") allow initially dirty (before attack identification and mitigation), and then clean (after the attack is identified and mitigation enacted), or pass-through traffic when no maliciousness is afoot. The outgoing traffic then travels to the customer machines, or to other machines, such as reverse proxies in a content delivery network.

In this context, the ingress routers employ signatures, rules, blacklists, thresholds, access control entities and access control lists, and the like. The ingress router generates a log line and issues alerts when one of those is triggered. The events may therefore be labeled with a suspected attack vector or in some way annotated with the triggering characteristics, signatures, or rules, etc. These log lines and alerts constitute the event messages that will be processed in accord with the teachings hereof. An ingress router's even messages can be used to help verify that data cleaning center mitigation is working properly, as dirty traffic would come in on ingress and clean traffic post mitigation would flow out of the scrubbing center on the egress router.

In sum, preferably the data cleaning center provides the data that will be processed, as will be described. Further, the information captured by the devices in the data cleaning center will correspond to the attributes and attribute values in that data. However, the teachings hereof are agnostic to the particular rules that are used or events that are captured.

Turning to the data processing itself, in a preferred embodiment, the techniques involve clustering and compression to achieve a reduction in the size of a data set. Clustering groups/tuples of data values together and summarizes results as a unique set which can be assigned to a single ID. In other words, each final row of data output from the invention is distinct, and thus, assignable to a unique identifier (id). Compression can be achieved in either or both of two ways. Compression by elimination reduces entries (rows) of data by eliminating duplicates. Compression by ascension generalization involves applying generalization whereby there are numerous ways of reclassifying an attribute through ascension of a hierarchical structure.

A related concept is attenuation. Preferably, the clustering and compression operation and results are attenuated by tuning of attributes via hierarchical generalization and attribute ordering. This means that a security analyst can tune results so that the system preserves essential information and does not remove it as part of the clustering and compression process. The attributes are preferably configured on a per-attribute basis, i.e., each threshold can be set independently from the others.

Useful features and benefits of the teachings hereof include: (1) reduction or elimination of overabundant and identical messages, while preserving the fidelity/exactness of message attribute descriptiveness when signals are grouped together; (2) reduction of a superset of messages to a more manageable subset so that prioritization can be assigned to the subset in intelligent and meaningful ways to identify relevant messages or message patterns; (3) provide a facility to figuratively identify, the 'needles' in the haystack, i.e., fleeting, small size, infrequent messages in the "haystack" of dominant surplus observations. These co-located 'needle' messages might very well reveal patterns, a basis for root cause diagnoses, novel attack vectors, and/or system insights. It may also help to (4) determine the attributes that should be chosen for storage or event identification (e.g., "what do we really need to store in this database?").

Of course, these features and benefits are merely exemplary; it it not necessary to achieve these benefits or use the above features when taking advantage of the teachings hereof.

Component and Operational Details

FIG. 1 provides a high level view of one embodiment of a system in accordance with the teachings hereof.

A data source (1000) like an anomaly or intrusion detector, SQL/mySQL/Redis data store, or a router log application provides data (i.e., HTTP header information, log file, intrusion detection alarms, or anomaly observations). The data provided can be in structured or unstructured formats.

The data is typically composed of event messages. An example of an event message, provided for illustration only, is:

['192.XXX.YYY', '192.XXX..YYY..ZZZ', 'ALERT', 'ScrubbingCenter A', 'UDP Flood', 'egress', 'ACCESS', 'ACME Corporation']

In this example, we have a partial IP address of an affected network host corresponding to the /24 ("192.XXX.YYY") CIDR block in which the host resides, the full /32, single IP address, ("192.XXX.YYY.ZZZ") of the host, The type of event observed, in this case an "ALERT", the scrubbing center involved in issuing/triggering the observed event "ScrubbingCenter A", the specific observation/signature/access control list entry type, "UDP Flood" leading to the observed event, the type of router the specific observation/signature was captured upon ("egress router"), the formal name of the router, "ACCESS", and lastly the name of customer/client owning the network host, "ACME Corporation."

(Note that the actual IP addresses in this example have been obfuscated by changing them to IP addresses within blocks reserved for documentation, as specified in IETF RFC 5737.)

The data received from the data source (1000) is pre-processed (2000). This means it is put into the appropriate structural format for input to the cluster and compression algorithms and processing features of this invention in (7000).

Figure 2:
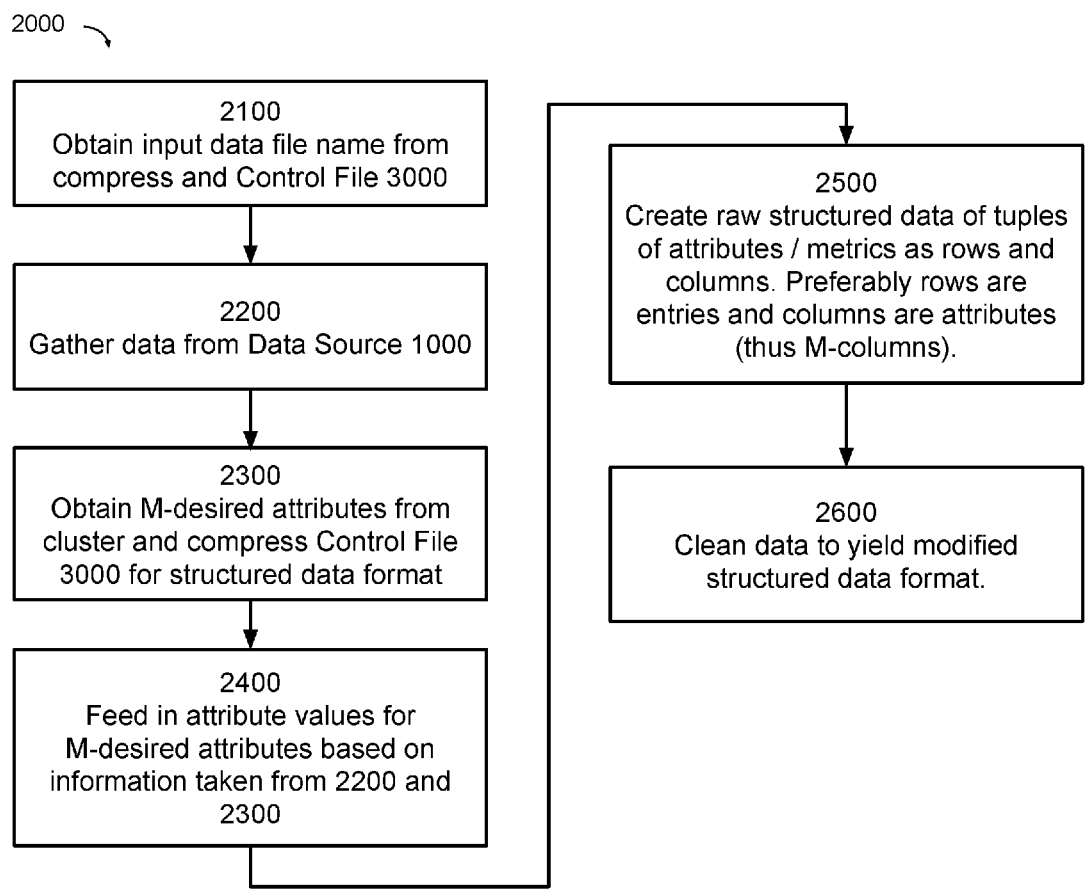
FIG. 2 is a logical flow diagram of one embodiment of a pre-processing function (2000) shown in FIG. 1.
Figure 3:
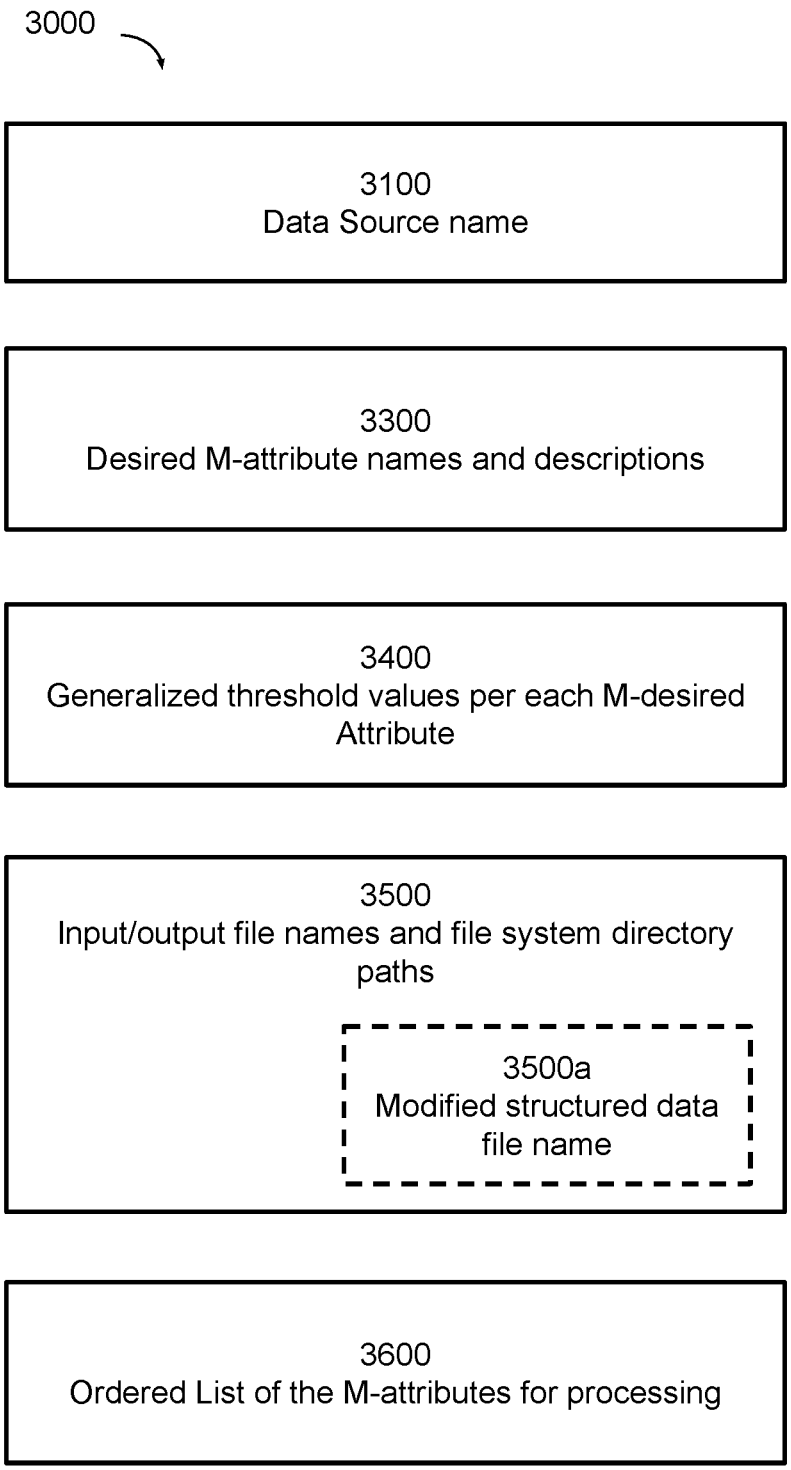
FIG. 3 is a conceptual diagram of the contents of the control file (3000) as shown in FIG. 1, in one embodiment.

With reference to FIGS. 2 and 3, the pre-processing in (2000) preferably involves the following:

At step 2100, get the input filename (3500 in FIG. 3) and file system path (3500 in FIG. 3) of the data source (1000) data from a control file (3000). The control file 3000 contents are shown in FIG. 3; the control file 3000 is preferably received from a user (e.g., security analyst or other personnel in a security operations center) specifying various parameters for the system.

At step 2200 gather the data from the data source (1000) using the filename and path information.

At step 2300, gather from the control file (3000) M-desired attributes(metric) names (2300). It could be the case that the data has greater than M attributes(metrics) or less than M attributes(metrics), but the control file specifies the M-attributes of interest. The pre-process step (2000) preferably creates a structured data set filling in null values when a desired attribute (metric) and its associated values are missing or reducing the superset of possible attributes(metrics) and their associated values coming from the data source (1000) to the M desired attributes and their associated values.

At step 2400, allocate values of the M attributes (metrics) into a tabular row, column format, creating a structured data entity as described in step 2500. In this embodiment, in the structured data, columns represent each of the M attributes (metrics) and rows represent the values for each attribute (if they exist or nulls added where they don't) for each entry of data coming from a data source (1000) input file (3500). At step 2600, clean the data to yield a modified structured data format.

FIG. 4 provides a more detailed view of a preferred structured data format. In that structured data format, every row, column pair equates to the value of an attribute (metric) (4000). An attribute (metric) value can be of numerical, string, categorical, date, or time type, in this example. The first instantiation of compiled structured data is referred to as "raw structured data" used as the input for this invention (4100). The cleaning step (2600) referred to in FIG. 2 involves "cleaning" the "raw structured data structure" (4100) to yield the modified structured data (4500) which is the eventual data to be consumed by the later stages. Cleaning at this step entails flattening concatenated observations of the jth attribute_j (metric_j) to several row entries where the jth attribute has only one observation (i.e., singular value). Note, this flattening out process can increase the size (i.e., the number of rows) of the overall structured data. The modified data structure is output as a file based on a filename designated by the user for the modified filename (3500$a$), obtained from the control file (3000). Other formatting steps may be also be performed as part of this cleaning step to organize and prepare the data for ingest.

The Cluster and Compress (C&C) Algorithm (5000) will now be described. The C&C Algorithm preferably obtains control information from the control file (3000). It gets the list of desired M attributes (metrics) (5100) and it gets the list of the M-attribute (metric) hierarchical tuning threshold numeric values (5200). The C&C Algorithm makes an ordered set/list of the M-attribute (metrics) names. In a preferred embodiment, the order of the attributes in this list is respected. This list can be obtained from the control file (part 3600) or specified directly in step (5300) (e.g., in a user interface). This list dictates the sequential order in which C&C operations will be performed upon the M-attributes (metrics).

At step (5400), the C&C algorithm obtains the modified structure data file name (3500$a$). It reads and enters the data from this file into a structured data object (e.g., list of list or table) following the order of attributes from (5300). For instance, if the data object takes a table format form, a row would be a tuple of the values of the M attributes (metrics) in the order prescribed in the control file (3600) or (5300), where each column in the table would be the value for the ith Attribute (metric) where $j \leq 1 \leq M$.

At step S500, a copy of the data object created in (5400) is made and set to a new data object (e.g., variable called current_version_data). This new data object is used for future manipulation. The original data is saved for possible C&C algorithmic efficiency analysis by comparing the original modified data set to eventual final post C&C processed data set. Also, the human operator may want to adjust the tuning of the control file parameters and run the process again on the original data.

At step S600, the core cluster and compression algorithm is executed. Preferably, the algorithm includes the following steps:

```
1.   For Aj in {list of ordered list of attributes (5300)}
         //Aj is the ith attribute name in the list of M attributes; where j ≤ 1 ≤ M.
2.      Get tuning threshold numeric value (5200) for Aj.
3.      Get attribute Aj's hierarchy from (6000) (FIGS. 6A, 6B)
                //See extended write-up on the hierarchical structures, below,
                //for deeper description of logical tree structure definition and usage.
4.      Set total_distinct_values = [the number of distinct column values of
     current_version_data, Ajth column] + threshold_numeric_value of Aj
       // We increment the total_distinct_values value by threshold_numeric_value plus
       // column count to force going through the while loop (lines 5 - 21) at least once for
       // for ascension generalization test.
5.      {While total_distinct_values > threshold numeric value_Aj
                //this outer while loop dictates if current level/depth will force future
                   // generalization and whether to stop operations on the (row,col) entries
                   // for the current attribute Aj
6.      {For row in current_version_data
                   //Outer for loop is for reading each row/data entry one at a time.
7.          {If (column of row == Attribute Aj's Name)
                      //only work with the data values for the current attribute,
                      // find the value in the current row associated with current Attribute, Aj
8.             check (row,col) value has parent in Aj's tree
                         //See if the current row,col value is a child node in Aj's attribute tree
9.             {If Parent exists
10.                replace (row,col) value with parent value in current_version_data
                         //compression by ascension. Generalize child to parent.
11.            }// End if parent exists
12.            else{
13.                keep (row,col) value
14.            } //end else parent does not exist
15.         }//end IF column of row =Attribute
16.      } //End For loop iterating through rows
17.      Get total_distinct_values of current_version_data for the column = Aj
18.      {if duplicate rows exist in current_version_data
                   //Compression by eliminating duplicates
19.         merge identical entries into single row entry in current_version_data
```

20.   }//end-duplicate version check
21.   } //End While loop
22. } // End - loop going through ordered list of attributes - Aj The above algorithm can be thought of as a modified version of an attribute-oriented-induction algorithm.

At step (5700), the C&C algorithm outputs final version of current_version_data to either a file specified by a file name supplied from control file (3500) which will be used by additional processes like (7000) or a User Interface (UI) (15000) for visualization, or a database (13000) for persistent storage.

An additional bit of processing of the C&C Algorithm's output can involve assignment of a prioritization or identifier to each output row entry (7000, FIG. 1). Prioritization or severity levels can be prescribed to rows based on types of alarms or anomalies. Likewise, identifiers can also be assigned like in the case of time series data analysis where an identifier would be a name juxtaposed with a time stamp. As a result, one can make observations that unique ID "X" has been witnessed every $3^{rd}$ Thursday of a month, for example.

Figure 7:
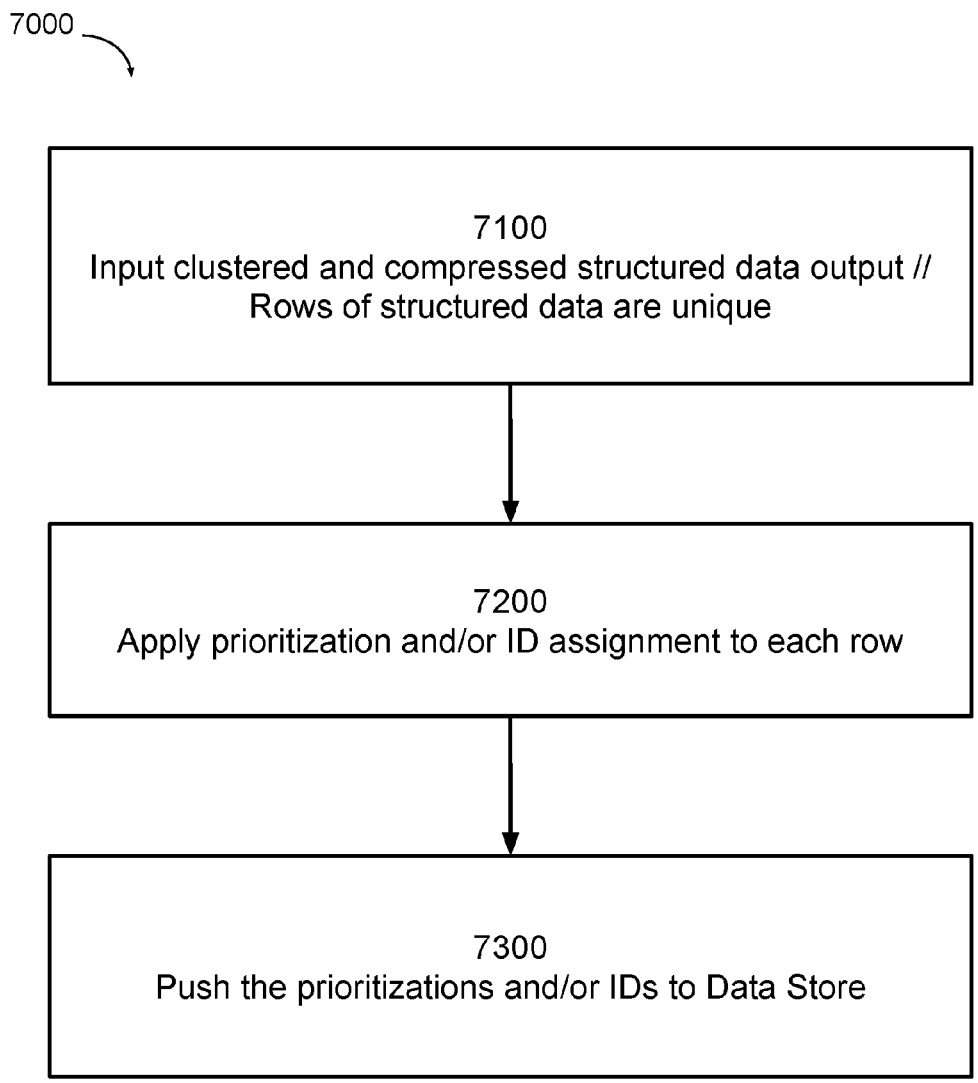
FIG. 7 is a logical flow diagram of one embodiment of a prioritize and ID assignment function (7000) shown in FIG. 1.
Figure 8A:
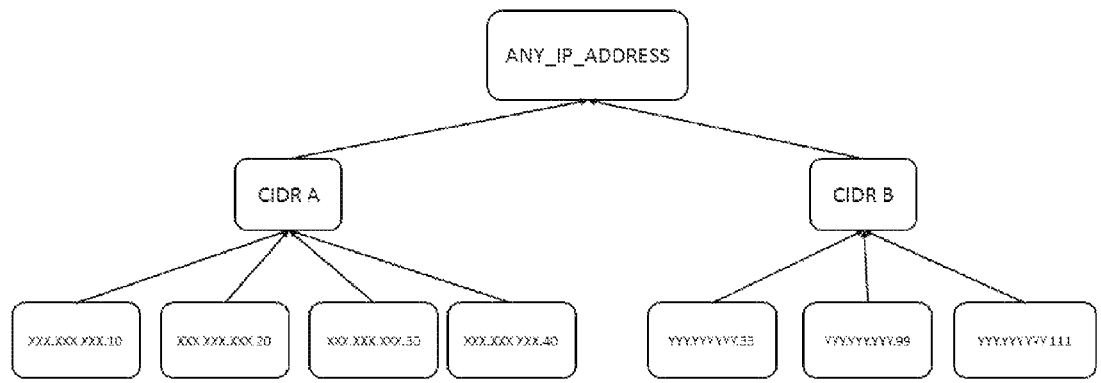
FIGS. 8A to 8D are examples of attribute hierarchical trees for each of the attributes in the Example described in the text.
Figure 8B:
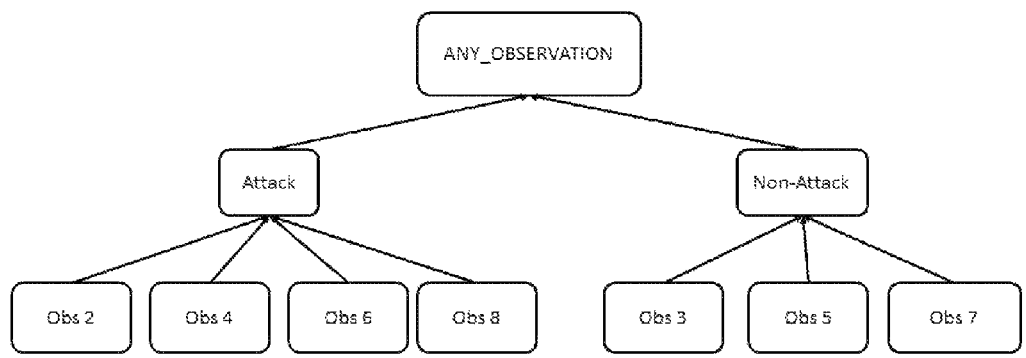
Figure 8C:
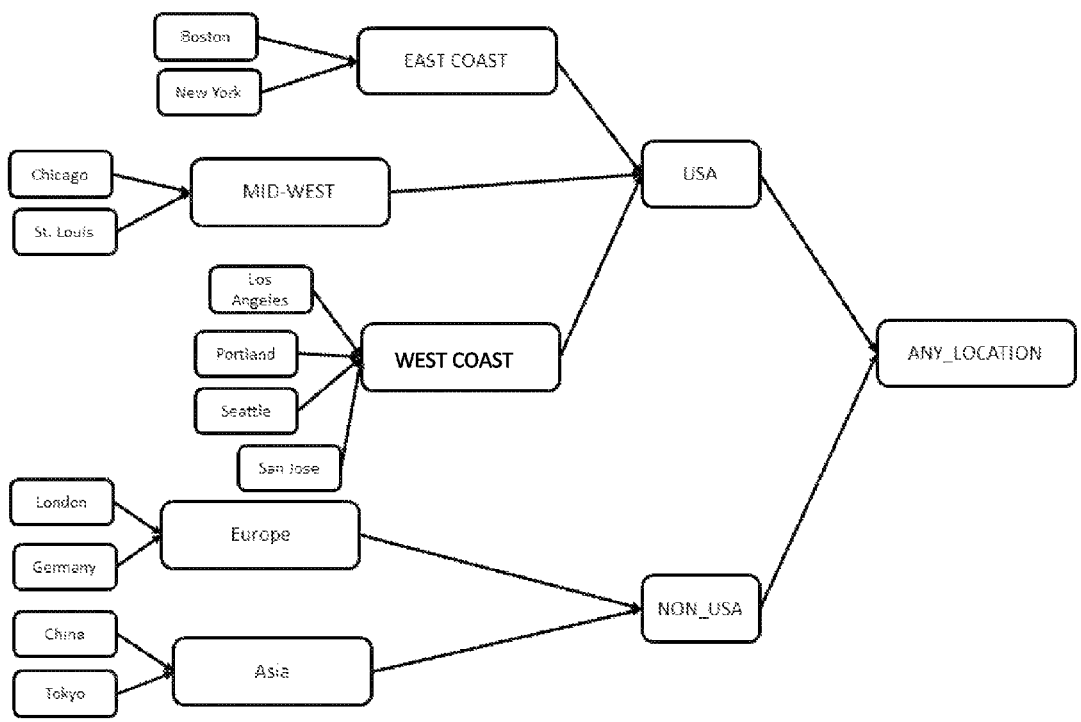
Figure 8D:
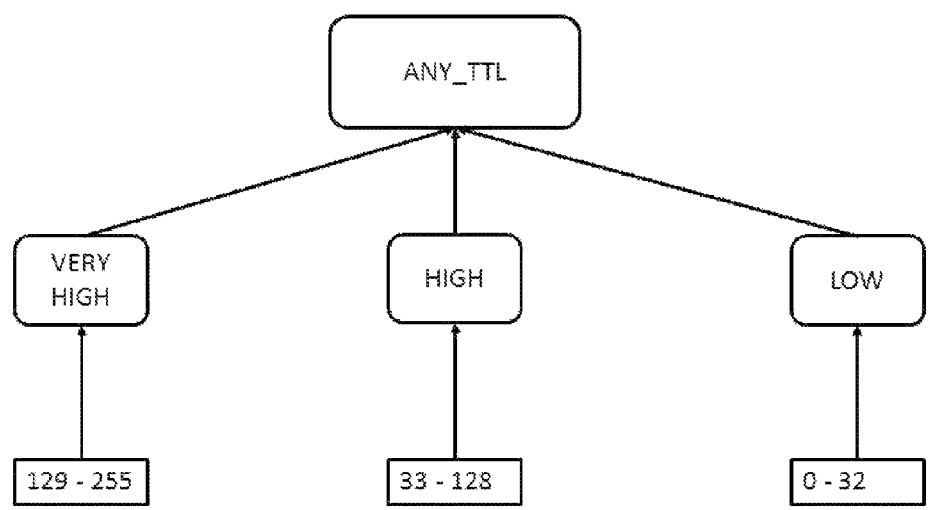

The Prioritization and ID assignment (7000) is shown in more detail in FIG. 7. It involves reading in the C&C Algorithm's final structured data output, in which preferably every row of the structured data being unrepeated (i.e., unique). Processing in (7000) includes applying a prioritization and/or identifier assignment to each row of the structured data (7200). And, finally (7000) pushes these ID's and/or prioritization (e.g., severity level) labels along with the row data values to a data store and/or user interface.

Extended Description of Hierarchical Logical Topologies for Attributes

The hierarchical structures used for attribute value generalization preferably take the form of Directed Acyclic Graphs (DAGs) that are hierarchical tree structures. Preferably, every attribute of the M-attributes(metrics) is modeled as a DAG tree. Examples are provided in FIGS. 6A and 6B. These are the attribute hierarchies that are stored in the database 6000 shown in FIG. 1. The attribute hierarchies may be created manually and stored in the system (e.g., by the security personnel in the SOC) or in alternate embodiments automatically generated by machine intelligence.

Generalizing, the k-th attribute (6100) of a set of M-attributes is modeled as a DAG and has the properties described in the following paragraphs.

Figure 6A:
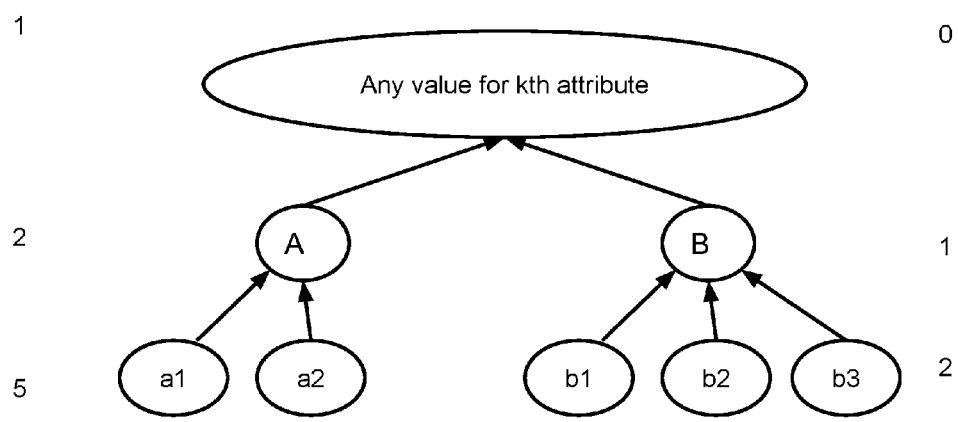
FIG. 6A is an example of a generalized logical topology for use as an attribute hierarchy (6000) in the system shown in FIG. 1.

First, the nodes of the tree are the set of all possible attribute values that the attribute can take. In mathematical terminology, this would refer to the DOMAIN of the attribute. FIG. 6A, (6100) shows an attribute hierarchy that has a domain of eight, in other words, there are eight possible values that the k-th attribute can take on.

Second, every attribute hierarchy has only one root represented by the Any-Value Attribute name. This root is the most generic representation of the attribute.

Third, every parent node can have one or more child node(s). However, every child node can have only one parent. In the attribute hierarchies, this child-parent relationship is shown as the directed edge from child to parent. This concept is important because nodes can only be generalized to nodes that (1) they have a connection (i.e., an edge exists between the nodes) and (2) that are at a depth/level value lower than them or closer to the root "All" node. This point may appear confusing as parent nodes appear visually higher in the tree, but in actuality are at lower depths/levels than their children. Depth works in reverse order here to height of the depicted tree hierarchy.

Figure 6B:
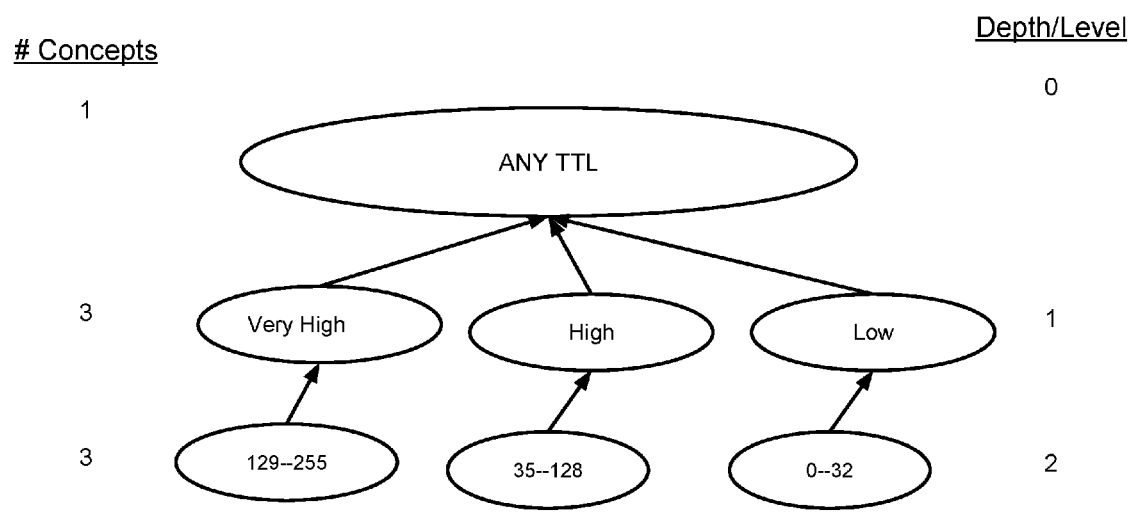
FIG. 6B is an example of the generalized logical topology of FIG. 6A for the quantized case.

Fourth, if an attribute value (i.e., node in the tree) is of numerical type, then preferably the value is quantized, as shown in FIG. 6B (6200). This quantization process translates the numerical value to a prescribed set of values based on a range of discrete magnitudes.

Fifth, a child node can be generalized to its parent's value, meaning the child node could be represented by a higher-level concept. So, in (6100), a leaf (level 2) value of "b2" could be substituted (i.e., generalized) to become "B". To illustrate further, if b1 equals "mozzarella", b2 equals "pepper jack", and B equals "cheese", it would be possible to generalize "pepper jack" as just "cheese" without losing too much information describing the attribute (value). This point is true if the metric just needed to specify food type.

Sixth, the highest level of ascension is the root node of an attribute hierarchy, the Any-Value-Attribute Name.

The choice of how much to generalize or ascend the attribute hierarchy is imposed by the threshold value for each attribute that is stored in the Cluster and Compress control file (3000). The threshold value determines the minimum number of concepts/lengths needed to describe the attribute, so in effect it provides a stopping criteria in addition to using knowledge of the existence of a parent to no longer pursue generalization.

The ability for an analyst to choose threshold value on a per-attribute basis enables an attribute to be conceptualized from a more specific value to a more abstract one, while still conveying the same level of information and providing opportunities for clustering and compressing messages when data entries for events that are in the data set are generalized, and then start to become redundancies. The redundancies can then be represented by a single entry instead of multiple ones.

Per-attribute threshold tuning allows experimentation with specific attributes to determine the sensitivity of those attributes in terms of how much more compression can be achieved by omitting them compared with how much important information is lost in that compression. This can help determine which attribute concept (think "pepper jack" versus just "cheese") need to be preserved or not for user-interface rendering or persistent data storage to convey an attribute value. In other words, more generalization equates to less processing and smaller memory footprints.

Specific Example of Algorithm Execution

Assume a set of M-desired attributes where M=4, and that an order of analysis of the attributes, as specified in a control file, is {A1, A2, A3, A4}={IP Address, Observation, Location, TTL}. Assume further that each attribute's generalization thresholds are set as A1=2, A2=2, A3=2, and A4=3. Finally, assume that the attribute hierarchies for the four attributes are as shown in FIGS. 8A to 8D.

The operation of the cluster and compress algorithm, configured as above, on a data set is now described. Shown in Table 1, below, is the raw data set that will be processed in this example. The four attributes are in the top row. Each row represents a four-tuple event message generated by an alarming or monitoring system (e.g., firewall, intrusion detection device, router, etc.) At the start, there are 12 rows in this data set.

TABLE 1

| IP Address | Observation | Location | TTL |
|---|---|---|---|
| YYY.YYYY.YYY.33 | Obs3; Obs5 | San Jose | 129 |
| XXX.XXX.XXX.30 | Obs6 | Chicago | 140 |
| XXX.XXX.XXX.30 | Obs7 | St. Louis | 20 |
| YYY.YYYY.YYY.99 | Obs8 | Boston | 250 |
| YYY.YYYY.YYY.111 | Obs6 | London | 33 |
| XXX.XXX.XXX.20 | Obs10 | Seattle | 20 |
| XXX.XXX.XXX.40 | Obs4 | Portland | 129 |
| YYY.YYYY.YYY.111 | Obs2 | Tokyo | 120 |
| XXX.XXX.XXX.20 | Obs5 | Los Angeles | 33 |
| YYY.YYYY.YYY.111 | Obs4 | Portland | 240 |
| YYY.YYYY.YYY.99 | Obs12 | Beijing | 64 |
| XXX.XXX.XXX.10 | Obs7 | New York | 250 |

After the pre-processing step (2000) in FIG. 1, the modified raw data set looks as shown in Table 2 below. Notice the concatenated observations in row 1 have been flattened out, creating a new row. Every row has only one observation. This modified data set extends the number of rows of the raw data set by one. Hence, there are 13 rows overall prior to C&C operations. This data is stored in a working data object called 'current_version_data' (5500 in FIG. 5).

TABLE 2

| IP Address | Observation | Location | TTL |
|---|---|---|---|
| YYY.YYYY.YYY.33 | Obs3 | San Jose | 129 |
| YYY.YYYY.YYY.33 | Obs5 | San Jose | 129 |
| XXX.XXX.XXX.30 | Obs6 | Chicago | 140 |
| XXX.XXX.XXX.30 | Obs7 | St. Louis | 20 |
| YYY.YYYY.YYY.99 | Obs8 | Boston | 250 |
| YYY.YYYY.YYY.111 | Obs6 | London | 33 |
| XXX.XXX.XXX.20 | Obs10 | Seattle | 20 |
| XXX.XXX.XXX.40 | Obs4 | Portland | 129 |
| YYY.YYYY.YYY.111 | Obs2 | Tokyo | 120 |
| XXX.XXX.XXX.20 | Obs5 | Los Angeles | 33 |
| YYY.YYYY.YYY.111 | Obs4 | Portland | 240 |
| YYY.YYYY.YYY.99 | Obs12 | Beijing | 64 |
| XXX.XXX.XXX.10 | Obs7 | New York | 250 |

Figure 5:
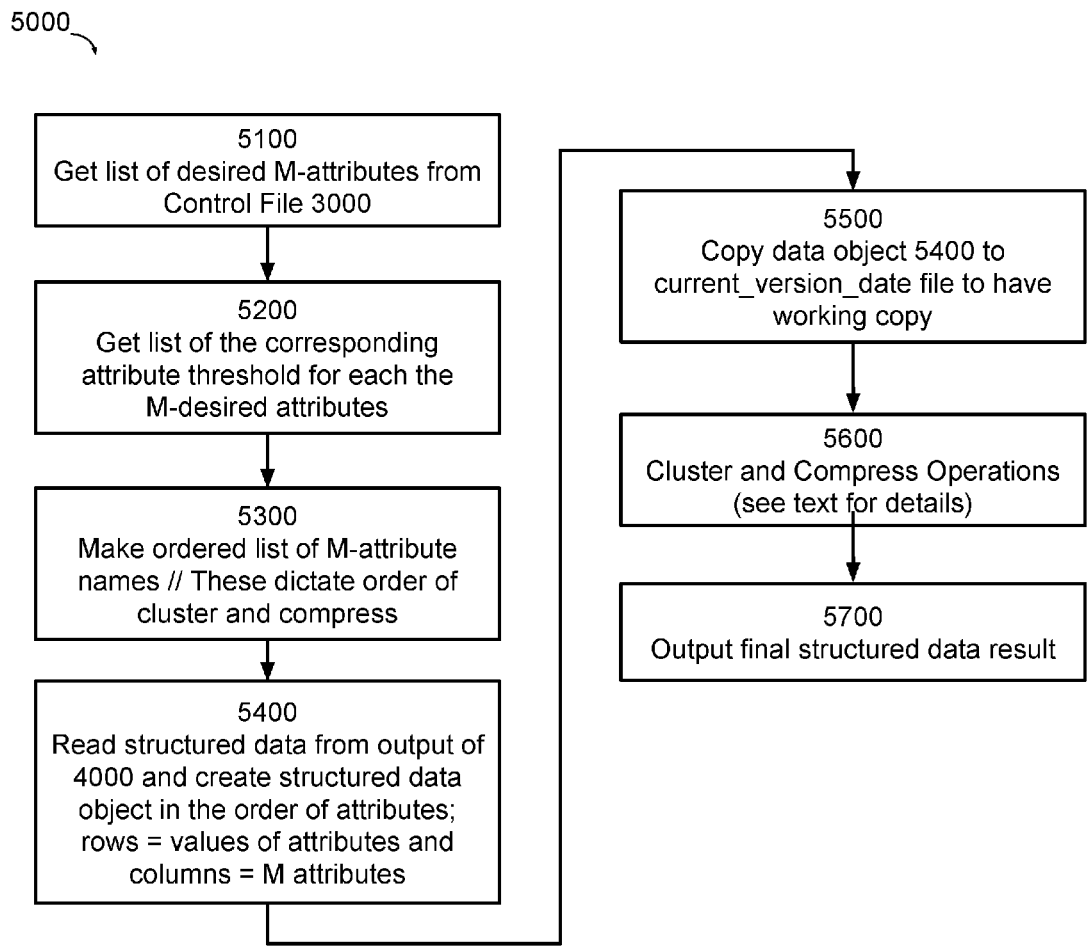
FIG. 5 is a logical flow diagram of an embodiment of the cluster and compression operation (5000) that was shown in FIG. 1.

The Cluster and Compress operations (5000) are now performed on the modified data set, following the steps illustrated in FIG. 5 and shown above. Specifically, the C&C algorithm (5600) operates as follows:

Line 1: Loops on the first attribute A1 (IP address) where j=1
Line 2: get's A1's tuning threshold=2
Line 3: gets A1's tree structure (FIG. 8A)
Line 4: total_distinct_values=8+2=10
Line 5: 10>2, so we go to line 6
Line 6: start looking at the current table of data (one row at a time)
Line 7: Look only at the row item whose column coincides with the IP address attribute (i.e., the first column).
Line 8: Check if a parent value exists for the current (row,col) entry (e.g., does XXX.XXX.XXX.33 have a parent?) the answer here is yes, so go to line 10
Line 10: replace (row,col) of current_version_data value with parent (e.g., CIDR A)
Go to next row and repeat operation on each to end of rows
Line 17: find the number of total_distinct values for column Aj. From current_version_data. Total_distinct_values=2
Line 18: check for duplicate rows. In this case there are no duplicates. Go to line 5. total_distinct=2 and threshold=2 so jump out of while loop and go to next attribute in Line 1.
The result is Table 3, below.

TABLE 3

| IP Address | Observation | Location | TTL |
|---|---|---|---|
| CIDR B | Obs3 | San Jose | 129 |
| CIDR B | Obs5 | San Jose | 129 |
| CIDR A | Obs6 | Chicago | 140 |
| CIDR A | Obs7 | St. Louis | 20 |
| CIDR B | Obs8 | Boston | 250 |
| CIDR B | Obs6 | London | 33 |
| CIDR A | Obs10 | Seattle | 20 |
| CIDR A | Obs4 | Portland | 129 |
| CIDR B | Obs2 | Tokyo | 120 |
| CIDR A | Obs5 | Los Angeles | 33 |
| CIDR B | Obs4 | Portland | 240 |
| CIDR B | Obs12 | Beijing | 64 |
| CIDR A | Obs7 | New York | 250 |

Next, the C&C operation proceeds to go through attribute A2. The specific steps proceed as follows:

Line 1: Loops on the second attribute A2 (Observations) where j=2
Line 2: get's A2's tuning threshold=2
Line 3: gets A2's tree structure (FIG. 8B)
Line 4: total_distinct_values=9+2
Line 5: 11>2 we go to line 6
Line 6: start looking at the current table of data one row at a time
Line 7: Look only at the row item whose column coincides with the Observation attribute (i.e. the $2^{nd}$ column).
Line 8: Check if a parent value exists for the current (row,col entry) (e.g., does Obj3 have a parent) the answer here is yes, so go to line 10
Line 10: replace (row,col) value with parent (e.g., NON-ATTACK)
Go to next row, repeat operation on each to end of rows
Line 17: find the number of total_distinct values for column Aj. Total_distinct_values=2
Line 18: check for duplicate rows. In this case, there are two duplicates.
Line 19: merge duplicates
Go to line 5. total_distinct=2 and threshold=2 so jump out of while loop and go to next attribute in Line 1.
Before line 19, the result is Table 4, below.

TABLE 4

| IP Address | Observation | Location | TTL |
|---|---|---|---|
| CIDR B | NON-ATTACK | San Jose | 129 |
| CIDR B | NON-ATTACK | San Jose | 129 |
| CIDR A | ATTACK | Chicago | 140 |
| CIDR A | NON-ATTACK | St. Louis | 20 |
| CIDR B | ATTACK | Boston | 250 |
| CIDR B | ATTACK | London | 33 |
| CIDR A | ATTACK | Seattle | 20 |
| CIDR A | ATTACK | Portland | 129 |
| CIDR B | ATTACK | Tokyo | 120 |
| CIDR A | NON-ATTACK | Los Angeles | 33 |
| CIDR B | ATTACK | Portland | 240 |
| CIDR B | ATTACK | Beijing | 64 |
| CIDR A | NON-ATTACK | New York | 250 |

The first two lines are now duplicates and are therefore merged in line 19, above, reducing the data set by one row.

Next, the column for attribute A3 is processed.
Line 1: Loops on the third attribute A3 (Location) where j=3
Line 2: get's A3's tuning threshold=2
Line 3: gets A3's tree structure (FIG. 8C)
Line 4: total_distinct_values=11+2
Line 5: 13>2 we go to line 6
Line 6: start looking at the current table of data one row at a time
Line 7: Look only at the row item whose column coincides with the Location attribute (i.e. the 3$^{rd}$ column).
Line 8 Check if a parent value exists for the current (row,col) entry (e.g., does Obj3 have a parent) the answer here is yes, so go to line 10
Line 10: replace row,col value with parent (e.g., East Coast)
Go to next row and repeat operation on each to end of rows
Line 17: find the number of total_distinct values for column A3 Total_distinct_values=5
Line 18 check for duplicate rows. In this case there are no duplicates
Go to line 5. total_distinct=5 and threshold=2, continue generalization down column again Line 6
At this point, the data is as shown in Table 5, below.

TABLE 5

| IP Address | Observation | Location | TTL |
|---|---|---|---|
| CIDR B | NON-ATTACK | WEST COAST | 129 |
| CIDR A | ATTACK | MIDWEST | 140 |
| CIDR A | NON-ATTACK | MIDWEST | 20 |
| CIDR B | ATTACK | EAST COAST | 250 |
| CIDR B | ATTACK | EUROPE | 33 |
| CIDR A | ATTACK | WEST COAST | 20 |
| CIDR A | ATTACK | WEST COAST | 129 |
| CIDR B | ATTACK | ASIA | 120 |
| CIDR A | NON-ATTACK | WEST COAST | 33 |
| CIDR B | ATTACK | WEST COAST | 240 |
| CIDR B | ATTACK | ASIA | 64 |
| CIDR A | NON-ATTACK | EAST COAST | 250 |

Now, continue generalization down column again Line 6, continuing to go through attribute A3. This involves:
Line 6: start looking at the current table Line 7—Look only at the row item whose column coincides with the Location attribute (i.e. the 3$^{rd}$ column).
Line 8: Check if a parent value exists for the current (row,col) entry (e.g., does MIDWEST have a parent) the answer here is yes, so go to line 10
Line 10: replace row,col value with parent (e.g., USA)
Go to next row and repeat operations for each to end of rows
Line 17: find the number of total_distinct values for column A3 Total_distinct_values=2
Line 18 check for duplicate rows. In this case there are no duplicates
Go to line 5. total_distinct_values=2 and threshold=2, so jump out of while loop and go to next attribute in Line 1.
Now the data set appears as in Table 6, below.

TABLE 6

| IP Address | Observation | Location | TTL |
|---|---|---|---|
| CIDR B | NON-ATTACK | USA | 129 |
| CIDR A | ATTACK | USA | 140 |
| CIDR A | NON-ATTACK | USA | 20 |
| CIDR B | ATTACK | USA | 250 |

TABLE 6-continued

| IP Address | Observation | Location | TTL |
|---|---|---|---|
| CIDR B | ATTACK | NON-USA | 33 |
| CIDR A | ATTACK | USA | 20 |
| CIDR A | ATTACK | USA | 129 |
| CIDR B | ATTACK | NON-USA | 120 |
| CIDR A | NON-ATTACK | USA | 33 |
| CIDR B | ATTACK | USA | 240 |
| CIDR B | ATTACK | NON-USA | 64 |
| CIDR A | NON-ATTACK | USA | 250 |

Next, the column for attribute A4 is processed.
Line 1: Loops on the fourth attribute A4 (TTL) where j=4
Line 2: get's A4's tuning threshold=3
Line 3: gets A4's tree structure
Line 4: total_distinct_values=9+2=threshold_A4
Line 5: 11>2 we go to line 6
Line 6: start looking at the current table Line 7—Look only at the row item whose column coincides with the TTL attribute (i.e. the 4th column).
See that the numeric values have to be quantized to specific levels for this tree
Line 8: Check if a parent value exists for the current (row,col entry) (e.g., does 129 fall in any parent range) the answer here is yes, so go to line 10
Line 10: replace row,col value with parent (e.g., VERY HIGH)
Go to next row and repeat operation on each row to end of rows
Line 17: find the number of total_distinct values for column A3 Total_distinct_values=3
Line 18: check for duplicate rows. In this case there are duplicates
Line 19: Merge duplicates
Go to line 5. total_distinct=3 and threshold=3, so jump out of while loop
Line 22: End attribute passing loop.
Before merging duplicates in line 19, the resultant data set is shown in Table 7, below.

TABLE 7

| IP Address | Observation | Location | TTL |
|---|---|---|---|
| CIDR B | NON-ATTACK | USA | VERY HIGH |
| CIDR A | ATTACK | USA | VERY HIGH |
| CIDR A | NON-ATTACK | USA | LOW |
| CIDR B | ATTACK | USA | VERY HIGH |
| CIDR B | ATTACK | NON-USA | HIGH |
| CIDR A | ATTACK | USA | LOW |
| CIDR A | ATTACK | USA | VERY HIGH |
| CIDR B | ATTACK | NON-USA | HIGH |
| CIDR A | NON-ATTACK | USA | HIGH |
| CIDR B | ATTACK | USA | VERY HIGH |
| CIDR B | ATTACK | NON-USA | HIGH |
| CIDR A | NON-ATTACK | USA | VERY HIGH |

As can be seen, there are a number of rows in Table 8 that are duplicates of other rows. Duplicative rows are merged (per line 19) and the final data set appears as is shown in Table 8.

TABLE 8

| IP Address | Observation | Location | TTL |
|---|---|---|---|
| CIDR B | NON-ATTACK | USA | VERY HIGH |
| CIDR A | ATTACK | USA | VERY HIGH |
| CIDR A | NON-ATTACK | USA | LOW |

TABLE 8-continued

| IP Address | Observation | Location | TTL |
|---|---|---|---|
| CIDR B | ATTACK | USA | VERY HIGH |
| CIDR B | ATTACK | NON-USA | HIGH |
| CIDR A | ATTACK | USA | LOW |
| CIDR A | NON-ATTACK | USA | HIGH |
| CIDR A | NON-ATTACK | USA | VERY HIGH |

The cluster and compression algorithm is now complete. This data set began with 13 rows and it is now reduced down to 8 unique rows based on four attributes, which have been generalized.

Note that in some embodiments, each row can be annotated with the number of event messages (rows) from the original data set that were consolidated into that row. This variation is shown in Table 9, below.

TABLE 9

| # of Original Event Messages | IP Address | Observation | Location | TTL |
|---|---|---|---|---|
| 2 | CIDR B | NON-ATTACK | USA | VERY HIGH |
| 2 | CIDR A | ATTACK | USA | VERY HIGH |
| 1 | CIDR A | NON-ATTACK | USA | LOW |
| 2 | CIDR B | ATTACK | USA | VERY HIGH |
| 3 | CIDR B | ATTACK | NON-USA | HIGH |
| 1 | CIDR A | ATTACK | USA | LOW |
| 1 | CIDR A | NON-ATTACK | USA | HIGH |
| 1 | CIDR A | NON-ATTACK | USA | VERY HIGH |

User Interface Considerations

There are many ways to present the results of the cluster and compression algorithm. One way is to enable a security analyst to select a time period (e.g., three minutes), which defines the data set as the raw event messages received during that period. Then, the data set is processed, and a table similar to Table 8 or 9 is presented as the summary of messages for the specified time period. Another way is to continually update Table 8 or 9 in real-time as more event messages are received from network security devices. In this case, the security personnel might simply select a "start" button or "start time" and from that point forward, the messages are accumulated, the cluster and compression is executed on a periodic basis (e.g., every few seconds), and the results (Table 8 or 9) are updated on the screen.

In either case, the security analyst can author and adjust the control file parameters (including attribute ordering and per-attribute thresholds) to obtain different views into the data set.

Computer Based Implementation

The teachings hereof may be implemented with conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 9:
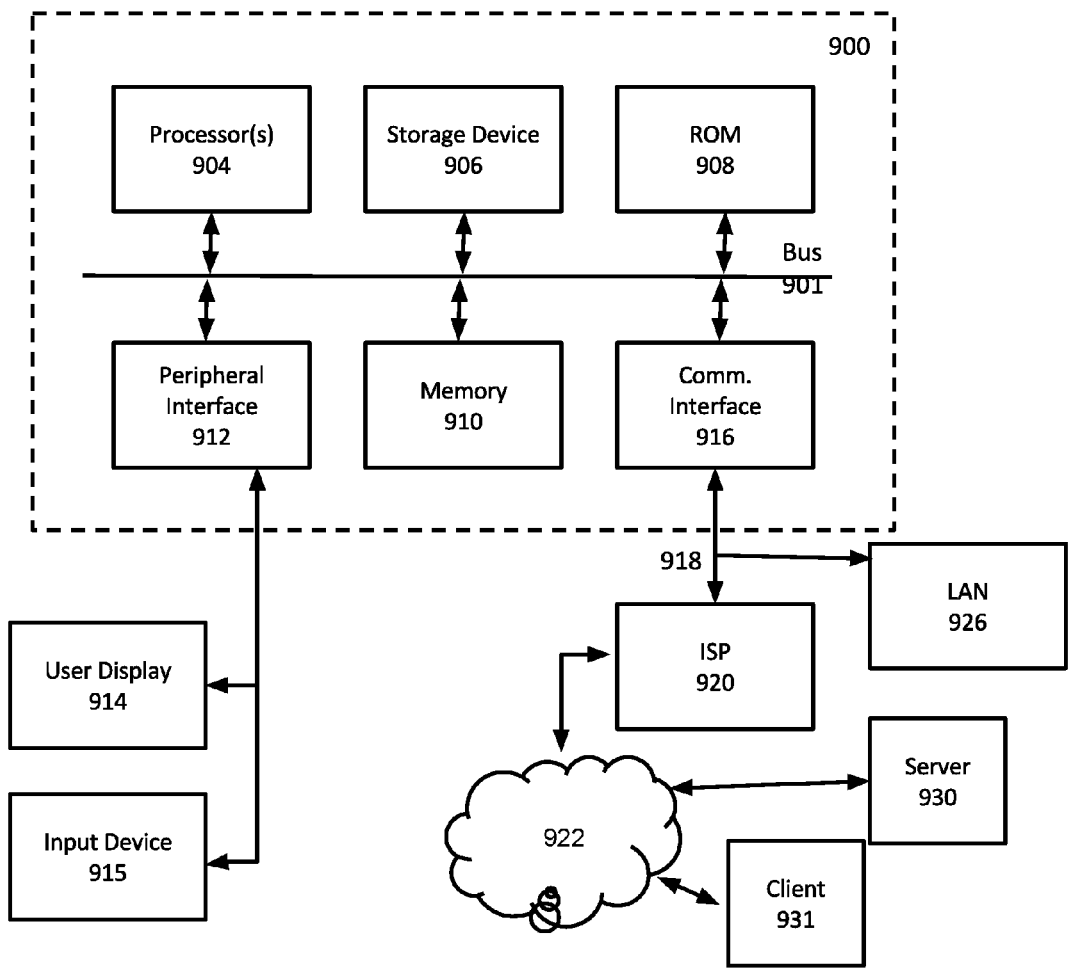
FIG. 9 is a block diagram illustrating hardware in a computer system that may be used to implement the teachings hereof.

FIG. 9 is a block diagram that illustrates hardware in a computer system 900 upon which such software may run in order to implement embodiments of the invention. The computer system 900 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 900 includes a microprocessor 904 coupled to bus 901. In some systems, multiple processor and/or processor cores may be employed. Computer system 900 further includes a main memory 910, such as a random access memory (RAM) or other storage device, coupled to the bus 901 for storing information and instructions to be executed by processor 904. A read only memory (ROM) 908 is coupled to the bus 901 for storing information and instructions for processor 904. A non-volatile storage device 906, such as a magnetic disk, solid state memory (e.g., flash memory), or optical disk, is provided and coupled to bus 901 for storing information and instructions. Other application-specific integrated circuits (ASICs), field programmable gate arrays (FPGAs) or circuitry may be included in the computer system 900 to perform functions described herein.

A peripheral interface 912 communicatively couples computer system 900 to a user display 914 that displays the output of software executing on the computer system, and an input device 915 (e.g., a keyboard, mouse, trackpad, touch-screen) that communicates user input and instructions to the computer system 900. The peripheral interface 912 may include interface circuitry, control and/or level-shifting logic for local buses such as RS-485, Universal Serial Bus (USB), IEEE 1394, or other communication links.

Computer system 900 is coupled to a communication interface 916 that provides a link (e.g., at a physical layer, data link layer,) between the system bus 901 and an external communication link. The communication interface 916 provides a network link 918. The communication interface 916 may represent a Ethernet or other network interface card (NIC), a wireless interface, modem, an optical interface, or other kind of input/output interface.

Network link 918 provides data communication through one or more networks to other devices. Such devices include other computer systems that are part of a local area network (LAN) 926. Furthermore, the network link 918 provides a link, via an internet service provider (ISP) 920, to the Internet 922. In turn, the Internet 922 may provide a link to other computing systems such as a remote server 930 and/or a remote client 931. Network link 918 and such networks may transmit data using packet-switched, circuit-switched, or other data-transmission approaches.

In operation, the computer system 900 may implement the functionality described herein as a result of the processor executing code. Such code may be read from or stored on a non-transitory computer-readable medium, such as memory 910, ROM 908, or storage device 906. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 918 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for processing a set of messages generated by one or more network security devices, where messages are generated from observations of network traffic, the method comprising:
   receiving a first set of messages that comprises a plurality of messages, each of the plurality of messages including an attribute name-value pair, each pair describing a characteristic of network packets observed by the one or more network security devices;
   receiving from a user a per-attribute threshold for at least a first attribute name and a second attribute name appearing in the first set of messages;
   for the first attribute name, receiving from the user a first attribute hierarchy comprising a directed acyclic graph that defines a set of parent-child relationships amongst first attribute values for the first attribute name; and,
   for the second attribute name, receiving from the user a second attribute hierarchy comprising a directed acyclic graph that defines a set of parent-child relationships amongst second attribute values for the second attribute name; and,
   executing a cluster and compression routine on the first set of messages at least by:
      (A) processing the first attribute, where said processing comprises:
         (i) determining whether the number of first attribute values appearing in the plurality of messages exceeds the corresponding threshold for the first attribute name;
         (ii) upon a determination that the number of first attribute values exceeds the corresponding threshold for the first attribute name, iterating through the first attribute values and replacing each value that has a parent value in the directed acyclic graph for the first attribute name with the parent value defined by the directed acyclic graph;
         (iii) upon a determination that the number of first attribute values fails to exceed the corresponding threshold for the first attribute name, moving to the next attribute for processing; and,
      (B) upon a determination that two or more messages in the first set of messages are duplicates as a result of the processing under (A), merging the duplicative two or more messages;
      (C) processing the second attribute, where said processing comprises:
         (i) determining whether the number of second attribute values appearing in the plurality of messages exceeds the corresponding threshold for the second attribute name;
         (ii) upon a determination that the number of second attribute values exceeds the corresponding threshold for the second attribute name, iterating through the second attribute values and replacing each value that has a parent value in the directed acyclic graph for the second attribute name with the parent value defined by the directed acyclic graph;
         (iii) upon a determination that the number of second attribute values fails to exceed the corresponding threshold for the second attribute name, moving to the next attribute for processing; and,
      (D) upon a determination that two or more messages in the first set of messages are duplicates as a result of the processing under (C), merging the duplicative two or more messages;
   based on the execution of the cluster and compression routine on the first set of messages, generating a second set of messages that has fewer messages than the first set of messages.

2. The method of claim 1, further comprising, after receiving the first set of messages, re-ordering the plurality of attributes in each message therein, in accord with an order specified in a configuration file.

3. The method of claim 1, wherein the plurality of messages in the first set includes one or more alarms.

4. The method of claim 1, further comprising: sending the second set of messages to a user interface in a security operations center.

5. The method of claim 4, further comprising, in response to sending the second set of messages to the user interface, receiving, from a user, a revised threshold for at least one of: the first attribute and the second attribute.

6. The method of claim 1, wherein the first attribute name comprises any of: IP address, port number, location.

7. The method of claim 1, wherein one of the directed acyclic graphs defines a CIDR block as a parent value for one or more child IP addresses.

8. The method of claim 1, wherein the cluster and compression routine is executed until the second set of messages consists only of unique messages.

9. The method of claim 1, wherein the first attribute name and the second attribute name represent fewer than all attribute names appearing in the first set of messages.

10. A system for processing a set of messages generated by network security devices, where messages are generated from observations of network traffic, the system comprising:
   a plurality of network security devices in a data cleaning center, each having circuitry forming at least one processor and memory storing instructions for execution by the at least one processor, the instructions including instructions that upon execution cause the respective network security device to generate messages based on observed network traffic;

a cluster and compression computer associated with the plurality of network security devices, the cluster and compression computer having circuitry forming at least one processor and memory storing instructions for execution by the at least one processor, the instructions including instructions that upon execution cause the cluster and compression computer to:

receive a first set of messages from the plurality of network security devices, the first set of messages comprising a plurality of messages, each of the plurality of messages including an attribute name-value pair, each pair describing a characteristic of network packets observed by the one or more network security devices;

receive from a user a per-attribute threshold for at least a first attribute name and a second attribute name appearing in the first set of messages;

for the first attribute name, receive from the user a first attribute hierarchy comprising a directed acyclic graph that defines a set of parent-child relationships amongst first attribute values for the first attribute name; and, for the second attribute name, receive from the user a second attribute hierarchy comprising a directed acyclic graph that defines a set of parent-child relationships amongst second attribute values for the second attribute name; and, execute a cluster and compression routine on the first set of messages at least by:

(A) processing the first attribute and then the second attribute, where said processing comprises:

(i) determining whether the number of first attribute values appearing in the plurality of messages exceeds the corresponding threshold for the first attribute name;

(ii) upon a determination that the number of first attribute values exceeds the corresponding threshold for the first attribute name, iterating through the first attribute values and replacing each value that has a parent value in the directed acyclic graph for the first attribute name with the parent value defined by the directed acyclic graph;

(iii) upon a determination that the number of first attribute values fails to exceed the corresponding threshold for the first attribute name, moving to the next attribute for processing; and, (B) upon a determination that two or more messages in the first set of messages are duplicates as a result of the processing under (A), merging the duplicative two or more messages;

(C) processing the second attribute, where said processing comprises:

(i) determining whether the number of second attribute values appearing in the plurality of messages exceeds the corresponding threshold for the second attribute name;

(ii) upon a determination that the number of second attribute values exceeds the corresponding threshold for the second attribute name, iterating through the second attribute values and replacing each value that has a parent value in the directed acyclic graph for the second attribute name with the parent value defined by the directed acyclic graph;

(iii) upon a determination that the number of second attribute values fails to exceed the corresponding threshold for the second attribute name, moving to the next attribute for processing; and, (D) upon a determination that two or more messages in the first set of messages are duplicates as a result of the processing under (C), merging the duplicative two or more messages;

based on the execution of the cluster and compression routine on the first set of messages, generate a second set of messages that has fewer messages than the first set of messages.

11. The system of claim 10, wherein the instructions stored by the cluster and compression computer further include instruction that when executed cause the cluster and compression computer to: after receiving the first set of messages, re-order the plurality of attributes in each message therein, in accord with an order specified in a configuration file.

12. The system of claim 10, wherein the plurality of messages in the first set includes one or more alarms.

13. The system of claim 10, wherein the instructions stored by the cluster and compression computer further include instruction that when executed cause the cluster and compression computer to: send the second set of messages to a user interface in the data cleaning center.

14. The system of claim 13, wherein the instructions stored by the cluster and compression computer further include instruction that when executed cause the cluster and compression computer to: in response to sending the second set of messages to the user interface, receive, from a user, a revised threshold for at least one of: the first attribute and the second attribute.

15. The system of claim 10, wherein the first attribute name comprises any of: IP address, port number, location.

16. The system of claim 10, wherein one of the directed acyclic graphs defines a CIDR block as a parent value for one or more child IP addresses.

17. The system of claim 10, wherein the instructions stored by the cluster and compression computer further include instruction that when executed cause the cluster and compression computer to: execute the cluster and compression routine until the second set of messages consists only of unique messages.

18. The system of claim 10, wherein the first attribute name and the second attribute name represent fewer than all attribute names appearing in the first set of messages.

19. The system of claim 10, wherein the plurality of network security devices comprise any of: routers, firewalls, switches.

* * * * *